May 18, 1965  R. J. WYLDE  3,184,689
OSCILLATOR WITH PHASE SHIFT START STOP CONTROLS
Filed Feb. 9, 1961  3 Sheets-Sheet 1

INVENTOR.
RONALD J. WYLDE
BY Howard W. Hermann
AGENT.

May 18, 1965   R. J. WYLDE   3,184,689
OSCILLATOR WITH PHASE SHIFT START STOP CONTROLS
Filed Feb. 9, 1961   3 Sheets-Sheet 3

INVENTOR
RONALD J. WYLDE
BY
Howard W. Hermann
AGENT.

United States Patent Office 3,184,689
Patented May 18, 1965

3,184,689
OSCILLATOR WITH PHASE SHIFT START STOP CONTROLS
Ronald James Wylde, Epping Forest, R.F.D. 1, Annapolis, Md.
Filed Feb. 9, 1961, Ser. No. 88,236
6 Claims. (Cl. 331—117)
(Granted under Title 35, U.S. Code (1952), sec. 266)

The invention described herein may be manufactured and used by or for the Government of the United States of America for governmental purposes without the payment of any royalties thereon or therefor.

The present invention relates to trigger circuits and, more particularly, to an improved circuit that triggers when preset values of a varying circuit element are reached.

Various types of devices for continuously monitoring the values of physical quantities in a variety of applications are in use at the present time. As examples, electric or electronic sensing devices are often used to monitor temperature pressure, speed, or conductivity. In such applications, the sensing elements feed into a triggering device which is designed to indicate by its output state whether the quantity being sensed is within a normal operating range or whether some abnormal condition exists. Such devices may be used, for example, in alarm systems of various types, in the production testing of electronic components, in the control of electrically monitored chemical process reactions, and in monitoring individual electronic components in active circuits.

Shipboard machinery systems, for example, require numerous monitoring devices for temperature, pressure, speed, salinity, etc. Each of these monitoring systems comprises a sensing element connected to an alarm triggering device. Existing shipboard monitoring systems generally use relays as the triggering device. However, relays are relatively shock sensitive and are subject to high attrition through mechanical wear and deterioration of electrical contacts. Relay operation is particularly bad under vibration when the input signal is slightly less than that required to close the relay. To alleviate these disadvantages, to some extent, stringent component requirements and their inherent added expense were necessary. Despite careful design and production of relay-type trigger devices, marginal, sometimes ambiguous, operation was all that could be hoped for in some applications. Further, the volume, weight and power rquirements for such prior art devices were often excessive. In addition, in order to be certain that the devices were operative, they often had to be periodically checked by trained personnel, again at additional time and expense.

The present invention eliminates the aforesaid disadvantages while providing additional inherent advantages in triggering applications. Relays are completely eliminated and cost, size, weight, and power requirements are considerably reduced.

The present invention is a simple circuit which monitors the condition of a remote sensing element and provides an alarm signal if the sensing element appears to register too high or too low conditions. The circuit comprises an oscillating loop which oscillates only as long as the impedance of the sensing element remains within a preset operating range. Oscillations stop whenever the resistance becomes either too high or too low; thus, the circuit also detects incipent line shorts or opens. By utilizing simple, long-life, solid state circuitry, stringent component requirements and marginal operation are avoided. Moreover, since the unit has no moving parts or delicate components, it is inherently shock resistant.

A primary object of the invention is to effect greater simplicity, reliability, and less power drain in a circuit for indicating when the value of a variable impedance circuit element is within a prescribed range.

Another object is the provision of a trigger circuit which utilizes only one active element, yet will have the capability of flipping from one output state to another under either of two conditions of a variable element.

A further object of the invention is to provide a circuit, controlled by a variable impedance sensing element, which will indicate, without possibility of ambiguity or any spurious effects due to mechanical shock or vibration, whether the sensing element is within its normal range, or is higher or lower.

Still another object is the provision of a monitoring circuit having the maximum of self-supervisory and fail-safe capabilities.

A still further object of the invention is to provide a trigger circuit which has advantages over existing circuits performing similar functions, in size, weight, and component complexity.

Other objects and many of the attendant advantages of the invention will be readily appreciated as the same become better understood by reference to the following detailed description when considered in connection with the accompanying drawings wherein.

Figure 1:
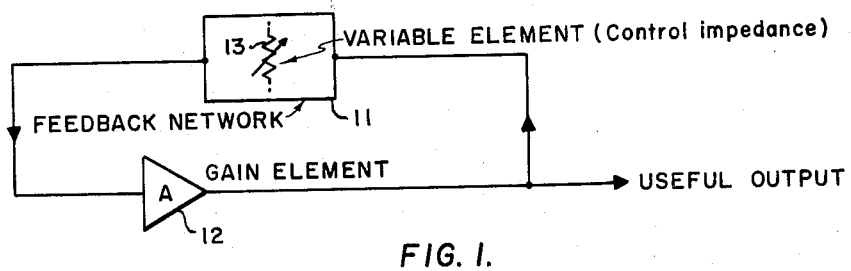
FIG. 1 is a block diagram showing the general arrangement of components and the flow of signals.

Referirng now to the drawings wherein like reference characters designate like or corresponding parts throughout the several views, there is shown in FIG. 1 a general block diagram of the invention. In FIG. 1, a special feedback network 11 having within it a variable resistance (or impedance) 13, is connected in a loop circuit having a simple gain element 12. This variable resistance (or impedance) is hereinafter referred to as the control impedance. Under certain conditions, elaborated below, the feedback through feedback network 11 is of the proper amplitude and phase so that sustained oscillations exist around the loop, i.e. the loop gain is equal to or greater than one and there is no overall phase shift. Thus, the circuit acts as a trigger circuit having a first output state in which the loop is nonoscillatory (the loop gain is less than one for all frequencies experiencing no overall phase shift), and no signal appears at the output, and a second output state in which the loop is in a steady-state oscillatory condition providing A.C. voltage (or current) to drive useful output means at the output terminals. The circuit operates without ambiguity; that is, the circuit must either be oscillating or not oscillating—no uncertain or intermediate states may exist.

Figure 2:
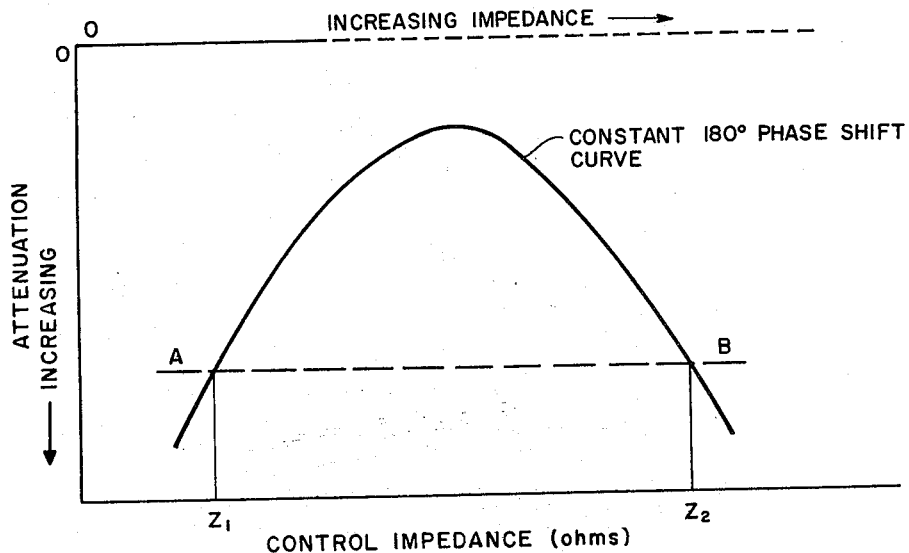
FIG. 2 is a plot of attenuation versus control impedance (as discussed below) for the feedback network of FIG. 1, under constant 180 degree phase shift conditions, as the control impedance is varied.

The specific and advantageous properties of the two-output-state trigger circuit are due to the unique characteristics of the feedback network which may be understood by reference to FIG. 2. The particularly advantageous networks of the invention each have one element, the control impedance, or in some cases a plurality of such elements, whose value varies in accordance with some external signal, or action being monitored. This element may optionally be remotely located from the rest of the circuit. This varying element may be, for example, any electrical or electronic sensing device whose impedance depends upon a physical quantity being sensed. All the specialized networks of the invention, however, will have at least one such variable element.

In all networks satisfying the requirement of the invention, attenuation and phase shift must depend on frequency and value of control impedance in the general manner described below, as represented by FIG. 2. In a particular network, such as those shown in FIGS. 3 and 4, for any value of control impedance there is a frequency for which the phase shift through the network is 180 degrees. If the attenuation through the network is measured for various values of control impedance and the frequency, at the particular value of control impedance, is adjusted to that value which results in precisely 180 degree phase shift between the output and input to the network, the curve resulting from plotting this attenuation vs. value of control impedance under these 180 degree phase shift conditions results in a graph such as that shown in FIG. 2. This graph illustrates the special property of the feedback networks of this invention that attenuation is smallest for some middle range of control impedance and becomes larger at both higher and lower values.

On FIG. 2, the solid line represents the attenuation characteristics of a feedback network of the invention under frequency conditions that lead to 180 degree of phase shift through the feedback network 11 of FIG. 1. The phase shift through the forward gain element 12 of the oscillating loop is also 180 degrees.

Referring again to FIG. 2, if the value of the control impedance 13 is less than a lower preset point $Z_1$, the attenuation of the feedback signal through the feedback element 11 is greater than the forward gain of gain element 12. Under these conditions, the total gain around the loop for a signal which experiences the two 180 degree phase shifts is less than 1. However, if the value of the control impedance 13 is between $Z_1$ and $Z_2$, as shown in FIG. 2, the attenuation in the feedback loop is less than the forward gain of the gain element. Under these conditions, the loop, which is excited by normal small noise in the circuit, springs into spontaneous oscillation and remains in an oscillating state. The steady state amplitude of these oscillations will be limited only by nonlinearities or saturation in the forward gain element. The insertion of appropriate non-linear elements in the loop leads to improved performance of the circuit.

Again, if the value of the control impedance exceeds $Z_2$, the attenuation in the feedback network is again greater than the gain of the forward gain element. Therefore, the circuit abruptly ceases oscillation and there is no output signal.

Figure 3:
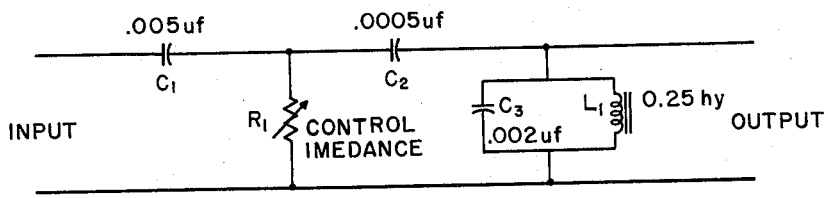
FIG. 3 is a circuit diagram of a ladder type feedback network which will satisfy the curve of FIG. 2.
Figure 4:
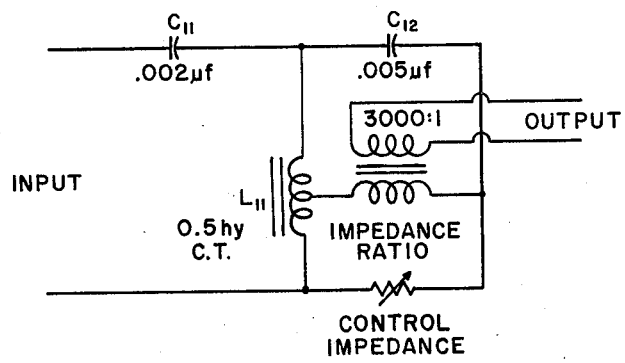
FIG. 4 is a circuit diagram of a bridge-type feedback network which will satisfy the curve of FIG. 2.

FIGS. 3 and 4 show two specific embodiments of feedback networks having the necessary characteristics for use in the present invention. In each of these embodiments, the input is connected to the output of the gain element 12 and the output of the circuit of each embodiment is connected to the input of the gain element 12, as shown in FIG. 1. Both networks possess the necessary peak in their attenuation vs. control impedance curves as plotted under 180 degree phase shift conditions. The functionings of both of these networks for the special purposes of this invention result from having one subnetwork, containing the control impedance, that predominantly shifts the phase, in combination with another subnetwork having a narrow bandpass attenuation characteristic. Since narrow bandpass sections inherently have a large amount of phase shift outside the pass band, these two subnetworks together achieve a characteristic such as plotted in FIG. 2. In FIG. 3, for instance, the control impedance in the first section (or subnetwork) in the ladder network serves mainly to vary the phase shift. This variation in phase shift, in combination with the high Q resonant circuit of the second section (or subnetwork) serves to achieve overall characteristics such as shown in FIG. 2. The input of FIG. 4 consists of a high Q series resonant circuit, $C_{11}$ and $L_{11}$, which achieves a narrow bandpass attenuation characteristic. The voltage developed across the center-tapped inductance $L_{11}$ feeds a conventional phase-shifting bridge, the remaining components of which are $C_{12}$ and the control impedance. Here again, the combination of $C_{12}$ and the control impedance serve predominantly to vary the phase shift, whereas the input portion of the network serves to establish the narrow passband.

The special networks of the invention and the operation of the illustrative circuits have been presented in terms of 180 degrees of phase shift in the feedback network and 180 degrees of phase shift in the forward gain part of the loop. These conditions, of course, permit the selective establishment of sustained oscillations around the loop. It will be apparent that oscillating loops having equivalent performance could be designed in which there was zero (or 360 degree) phase shift in the feedback networks, in combination with zero (or 360 degree) phase shift in the forward gain path. In such networks the characteristics plotted in FIG. 2, would be determined under conditions of zero (or 360 degree) phase shift for each value of control impedance. If, under these conditions, the attenuation was smallest for some middle range of control impedance and became larger for both higher and lower values, the special advantages of the invention could be achieved. It is the intention of this specification that networks similar to those depicted in FIGS. 3 and 4, and having a peaked attenuation characteristic such as that shown in FIG. 2 for conditions of zero (or 360 degree) phase shift and used with forward gain elements having zero (or 360 degree) phase shift, as well as similar circuits having any other allocation of phase shift between the forward and feedback paths that permits the selective establishment of oscillations only for some middle range of a control impedance, are included within the scope of the invention.

It must be pointed out, however, that not all ladder-type or bridge-type networks having topologys similar to those shown in FIGS. 3 and 4 will have peaked attenuation characteristics, under fixed phase shift conditions, such as those illustrated by FIG. 2. Specific and restrictive relationships among the values of all the components are required in order for this peaked attenuation characteristic under fixed phase shift conditions to appear. It is essential however, for the purposes of this invention that the feedback networks combine appropriate phase shifting means with bandpass determining means in a manner that provides an overall peaked attenuation characteristic as measured under fixed phase shift conditions. It will be apparent to those skilled in the art that many rearrangements of the networks exemplified by FIGS. 3 and 4 can be devised to meet the special purposes of this invention. In addition, networks of different topology will achieve the end purposes of this invention provided attenuation and phase shift responsive to variations in the control impedance under fixed phase shift conditions result in the desired overall peaked attenuation characteristic. Since the existence of an oscillatory or non-oscillatory state is a property of the gain and attenuation around the entire loop comprising this invention, the special phase shifting and bandpass determining elements may optionally be included in the structure of the forward gain path.

Figure 5:
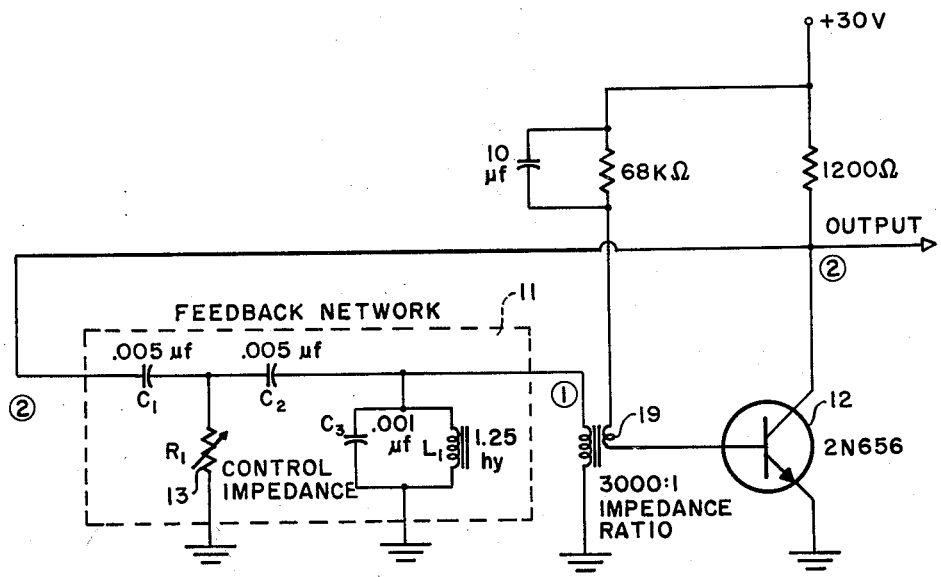
FIG. 5 is a circuit diagram of a complete embodiment of the invention utilizing a feedback network similar to that shown in FIG. 3.

An operative embodiment of the device is illustrated in FIG. 5, which utilizes a feedback network 11 similar to that shown in FIG. 3. In the first section of the feedback network, the variable control impedance 13 in combination with $C_1$, serve as a phase shifting voltage divider. In the second section a high Q parallel resonant circuit, $L_1C_3$, establishes a narrow bandpass characteristic. The overall characteristics of this feedback network are such as to allow oscillation around the loop (at approximately 4,000 c.p.s.) when the value of $R_1$ is within the range between 1,200 ohms, and 10,800 ohms and to block oscillation if $R_1$ is either greater than 10,800 ohms or less than 1,200 ohms.

Gain element 12 comprises a 2N656 transistor in a simple amplifier circuit without gain stabilization. The transistor base is coupled to feedback network 11 by a 3000:1 impedance ratio transformer to match the high output impedance of the feedback network to the low base impedance of the transistor. The emitter is grounded, and the collector provides the output a portion of which is fed back into feedback network 11.

Figure 6:
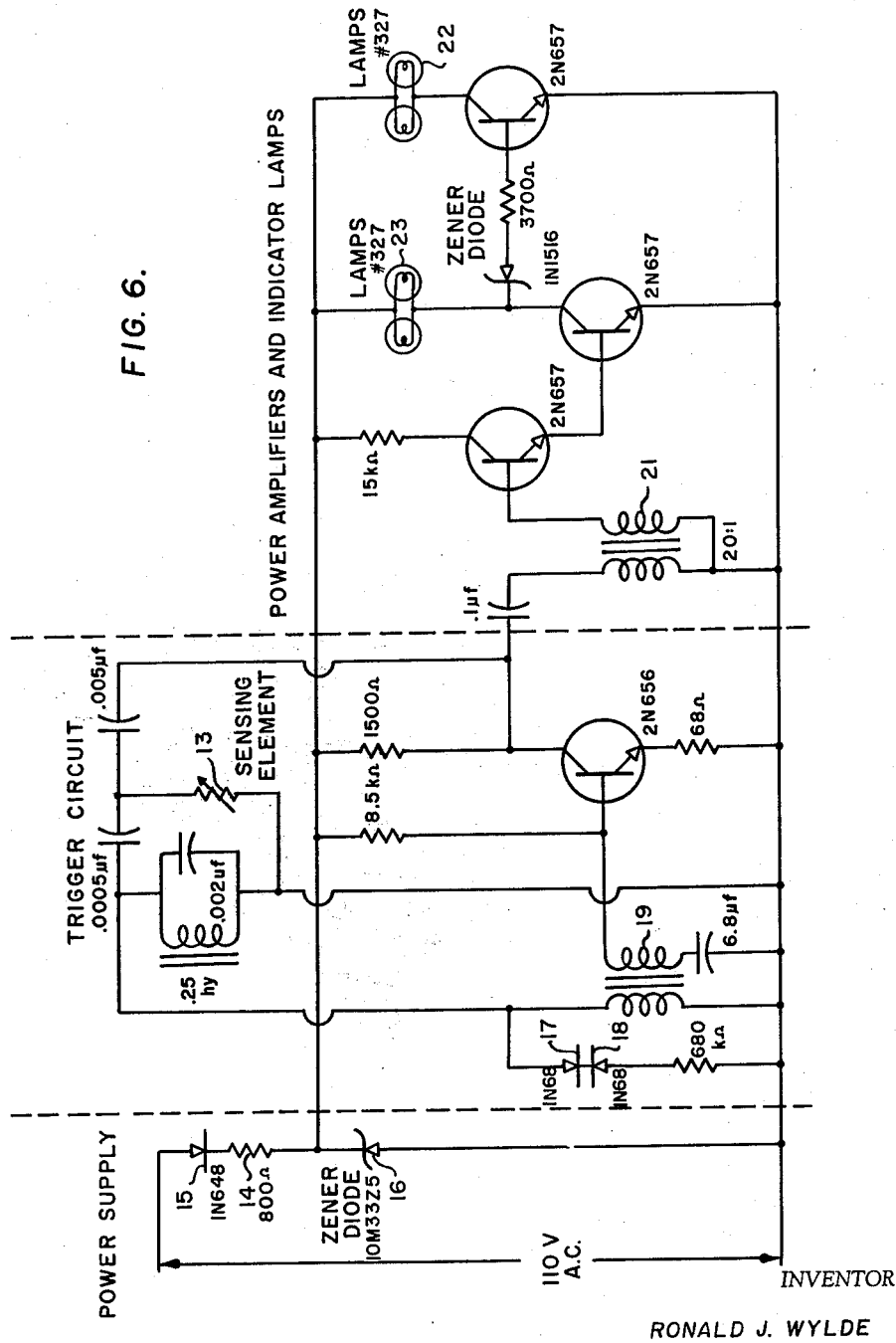
FIG. 6 is a circuit diagram of a complete alarm system utilizing the invention.

With the feedback path disconnected the voltage gain between points 1 and 2 is about 10. The minimum attenuation of the feedback circuit occurs when the value of control resistor R, has a value of approximately 3600 ohms. During the oscillatory state an output of about 5 volts R.M.S. is provided. It will be realized that the oscillatory range and frequency can be varied to suit specific design requirements by suitable choice of amplifier gain or use of different values of resistance, capacitance and inductance in the feedback network. A practical embodiment of the invention is illustrated in FIG. 6 wherein a trigger circuit similar to that shown in FIG. 5 is shown together with its power supply and indicating devices. The device as shown schematically in FIG. 6 is designed to provide a "safe-alarm" indication of the physical condition sensed by the control impedance or sensing element (for instance, a thermistor) of the feedback network. In the oscillatory state of the trigger circuit a lamp for illuminating a "safe" indicator is lit; when the circuit ceases oscillations an "alarm" indicator is lighted and the "safe" indicator goes off.

As shown in FIG. 6, a power supply designed to be powered from a standard 110 volt, 60 cycle line comprises a rectifying diode 15 connected in series with a voltage reducing resistor 14 and makes use of the voltage controlling properties of a Zener diode 16 connected across the power input of the trigger circuit and indicating circuit.

The trigger circuit of FIG. 6 is modified from that illustrated in FIG. 5 in that a pair of diodes 17, 18 are connected back-to-back in series across the primary of the impedance matching transformer 19. Diodes 17 and 18 provide symmetrical nonlinearity to the oscillatory behavior of the circuit, and, particularly, to the gain-amplitude curve of the transistor amplifier. These diodes 17, 18 have virtually no effect on the circuit for high amplitude input signals to the amplifier from the feedback network but at very small signal amplitudes they serve to reduce the gain of the system.

The small-signal behavior of the trigger circuit is significant at the two points where the (180 degree phase shift) attenuation of the feedback network is just equal to the forward gain of the amplifying transistor. As the resistance of the sensing element changes and the (180 degree phase shift) attenuation of the feedback network decreases to a minimum and then gradually increases again, suppression of the small-signal gain insures that the trigger circuit, once it springs into oscillation, oscillates at nearly maximum amplitude; and, similarly for the cessation of oscillations, no small-amplitude oscillations are possible. Without the nonlinearities introduced by diodes 17, 18, the output of the trigger circuit would not provide such sharp definition between the oscillatory and nonoscillatory states. For the larger amplitudes the gain of the circuit quickly reaches a maximum and as gross saturation takes place, the gain decreases rapidly, thus providing an output signal of nearly uniform amplitude. Under these conditions, it is impossible for the circuit to be in any intermediate state; it must be totally nonoscillatory or else oscillating with an output of useful amplitude.

The output of the trigger circuit is coupled by an output transformer 21 to the power amplifiers and indicator lamps 22, 23. Thus it is seen from the circuit of FIG. 6 that when the trigger circuit is oscillating, thereby providing an output to the power amplifier, lamps 22 will be energized to the exclusion of lamps 23, but when the trigger circuit stops oscillating and the output of the trigger circuit drops to zero, lamps 23 will be energized and lamps 22 will go out.

Thus by providing a "safe" indicator on lamps 22 and an "alarm" indicator on lamps 23, an effective alarm system is formed. When the resistance value of the trigger circuit sensing element is less than the lower predetermined point there is no oscillation in the circuit and the "alarm" signal is energized. Precisely as the resistance value of the sensing element reaches the lower set point the circuit becomes capable of oscillation and oscillates at a steady state amplitude determined by the nonlinearities in the forward gain element providing an output to energize the "safe" signal. This condition continues between the lower and upper predetermined points. As soon as the resistance value of the sensing element exceeds the upper predetermined limit, oscillations stop abruptly and since no output is derived from the trigger circuit, the "alarm" signal is again energized.

Although the gain element has been shown as a transistor, it will be realized by those skilled in the art that a vacuum tube, magnetic amplifier, or other gain device, may be used in its place with proper circuit redesign provided the gain element is capable of providing sufficient gain and an appropriate phase shift of the amplified signal at the same time. For operation of the circuit of the invention, it is only necessary that the forward gain of the gain element, when loaded with its normal output means be sufficient to overcome the dissipative losses of the feedback network in the region of its peaked attenuation response.

Again, although the useful output means has been shown in FIG. 6, as a plurality of power amplifiers and indicating lights, it will be realized that bells, buzzers, or various other indicators, may be utilized to advantage. Alternatively or simultaneously the output may actuate appropriate control devices.

Obviously, many other modifications and variations of the present invention are possible in the light of the above teachings. It is, therefore, to be understood that within the scope of the appended claims, the invention may be practiced otherwise than as specifically described.

What is claimed is:

1. A selectively oscillating loop that oscillates only when the value of a variable impedance which is coupled to said oscillating loop is both above a lower set point and below an upper set point comprising:

a forward gain element, a feedback means coupled between said input and said output of said forward gain element;

means for establishing a frequency standard, said means being operably coupled to said feedback means;

a variable impedance means variable through three ranges of impedance, said first range being below said first point, said second range being between said first point and said second point and said third range being above said second point;

whereby said variable impedance means forms a phase shifting means operable through a first, a second and a third consecutive phase range with said first, second and third phase range respectively corresponding to said first, second and third range of said variable impedance, said second range being the only range effective to maintain said feedback means and said forward gain means in oscillations by having the proper phase relationship.

2. The invention as defined in claim 1 wherein means are included in said loop for introducing nonlinearities in said gain element to provide small amplitude gain reduction whereby only oscillations of relatively large amplitude will appear at said output terminal.

3. An alarm circuit for indicating whether a physical quantity is within a predetermined range or outside this range, including values both above and below said predetermined range, comprising a sensing element having a resistance which varies in accordance with said physical quantity, an electronic valve element having output and input terminals, a feedback network connected between said output terminal to said input terminal of said electronic valve, means for establishing a frequency standard connected to said feedback network, means connecting said sensing element to said feedback network, said sensing element forming a phase shifting means operable through three consecutive phase ranges with only the predetermined center range being effective to maintain oscillation by having the proper phase relationship whereby said predetermined phase ranges correspond to said predetermined ranges of said physical quantity, means for indicating the oscillatory state of said feedback network connected to said output terminals whereby an output voltage appears at said output terminal while said electronic valve and feedback network are oscillating; said phase shifting means being also operative to prevent oscillations in said electronic valve and feedback network whenever the resistance of said sensing element is outside said predetermined range, including values both less than and greater than said predetermined range of resistance of said sensing element.

4. A monitoring circuit for indicating deviations above and below a normal operating zone comprising; an electronic valve having an input terminal and an output terminal a feedback circuit means coupled between the input and output terminal of said electronic valve, circuit means for establishing a frequency standard coupled to said feedback circuit means, variable impedance means variable through three ranges of impedance, said first range being below a first point, said second range being between said first point and a second point and said third range being above said second point whereby said variable impedance means forms a phase shifting circuit means, operable through three consecutive phase ranges, each of said phase ranges respectively corresponding to said impedance ranges, means coupling said variable impedance to said feedback circuit, means causing said feedback circuit to oscillate, said last named means solely comprising said second range of impedance whereby said feedback circuit being in a non-oscillatory state when said phase shifting circuit means is in its first and third states and said second range of impedance corresponds to said normal operating zone.

5. A selectively oscillating loop comprising, a first transistor having an input electrode, an output electrode and a common electrode, a feedback network coupled between the said input electrode and said output electrode of said transistor, means for establishing a frequency standard coupled to said feedback network, means causing oscillations in said feedback network and said transistor, a variable impedance means variable through three ranges of impedance, said first range being below a first point, a second range being between said first point and a second point and said third range being above said second point, means coupling said variable impedance means to said feedback network, said means causing oscillations in said feedback network and said transistor solely comprising said second range of impedance of said variable impedance whereby said variable impedance means forms a variable phase shifting circuit means, operable through three consecutive phase ranges, each of said ranges respectively corresponding to said impedance ranges, said feedback network being in a non-oscillatory state when said phase shift circuit means is in its first and third ranges.

6. A selectively oscillating loop comprising a transistor having an emitter electrode, base electrode and collector electrode, a junction point, a first capacitor having one end connected to the said collector electrode and its other end connected to said junction point, a variable impedance connected between said junction point and said emitter electrode, a parallel connected capacitor and inductor having one end connected to said emitter electrode, a third capacitor connected between said junction point and the other end of said parallely connected capacitor and inductor, said other end of said parallely connected capacitor and inductor being coupled to the base, electrode of said transistor whereby said variable impedance forms a variable phase shifting circuit means operable through three consecutive phase ranges, with only the center range being effective to maintain oscillations by having the proper phase relation.

References Cited by the Examiner

UNITED STATES PATENTS

| | | | |
|---|---|---|---|
| 2,556,296 | 6/51 | Rack | 331—135 |
| 2,756,335 | 7/56 | Snyder | 331—175 |
| 2,941,160 | 6/60 | Beake et al. | 331—183 |
| 2,947,915 | 8/60 | Patchell | 317—148.5 |
| 2,997,664 | 8/61 | Jensen | 331—183 |

OTHER REFERENCES

Designing Transistor Circuits, Sinusoidal Transistor Oscillators, by Hurley in Electronic Equipment, October 1957, pages 20–27.

ROY LAKE, *Primary Examiner.*

JOHN KOMINSKI, *Examiner.*